(12) United States Patent
Chang et al.

(10) Patent No.: US 8,448,138 B2
(45) Date of Patent: May 21, 2013

(54) RECORDING USER-DRIVEN EVENTS WITHIN A COMPUTING SYSTEM

(75) Inventors: Wen-Chieh Chang, Taipei (CN); Shu-Fang Huang, Taipei (CN); Yan-Mei Jiang, Taipei (CN); Ling-Ya Huang, Taichung (CN); Li Wen, Redmond, WA (US); Chih-Yung Chen, Taipei (CN); Michael Jen-Chiung Chang, Taipei (CN); Hung Ju King, Sindian (CN); Yuli Huang, Taipei (CN)

(73) Assignee: Microsoft Corporation, Redmond, WA (US)

( * ) Notice: Subject to any disclaimer, the term of this patent is extended or adjusted under 35 U.S.C. 154(b) by 1317 days.

(21) Appl. No.: 12/014,756

(22) Filed: Jan. 15, 2008

(65) Prior Publication Data

US 2009/0182753 A1 Jul. 16, 2009

(51) Int. Cl.
*G06F 3/033* (2006.01)
*G06F 3/048* (2006.01)
*G06F 17/27* (2006.01)
*G06F 9/44* (2006.01)

(52) U.S. Cl.
USPC ............ 717/124; 715/246; 715/802; 715/863

(58) Field of Classification Search
None
See application file for complete search history.

(56) References Cited

U.S. PATENT DOCUMENTS

| | | | |
|---|---|---|---|
| 5,781,720 A | 7/1998 | Parker et al. | |
| 6,067,639 A | 5/2000 | Rodrigues et al. | |
| 6,301,701 B1 | 10/2001 | Walker et al. | |
| 6,622,298 B1 | 9/2003 | Stamm | |
| 6,802,055 B2 * | 10/2004 | Jade et al. | 717/130 |
| 6,948,152 B2 | 9/2005 | Dubovsky | |
| 6,968,509 B1 * | 11/2005 | Chang et al. | 715/802 |
| 7,099,893 B2 * | 8/2006 | Bischof et al. | 717/124 |
| 7,146,572 B2 | 12/2006 | Richardson | |
| 7,251,667 B2 * | 7/2007 | Atkin | 1/1 |
| 7,389,223 B2 * | 6/2008 | Atkin et al. | 704/8 |
| 7,458,064 B2 * | 11/2008 | Potts et al. | 717/124 |
| 7,464,373 B1 * | 12/2008 | Yunt et al. | 717/125 |

(Continued)

FOREIGN PATENT DOCUMENTS

EP 0869433 A2 7/1998

OTHER PUBLICATIONS

Rob Sinclair, Microsoft Active Accessibility: Architecture, May 2000, Microsoft Corporation, <http://msdn.microsoft.com/en-us/library/ms971310.aspx>.*

(Continued)

*Primary Examiner* — Thuy Dao
*Assistant Examiner* — Cuong V Luu
(74) *Attorney, Agent, or Firm* — Hope Baldauff Hartman, LLC

(57) ABSTRACT

Technologies are described herein for recording user-driven events within a computing system. An interface is established between a recorder application and an input method editor ("IME") executing on the computer system. Through the use of the interface, the recorder application can obtain and record data identifying user-driven events that are performed within the IME. An interface is also established between the recorder application and a UI control that does not expose data regarding user-driven events through standard system calls. Through the use of the interface, the recorder application can obtain and record data identifying user-driven events detected at the UI control. The recorder application can also provide data identifying the recorded user-driven events directly to a bug tracking application program for inclusion in a bug database.

13 Claims, 6 Drawing Sheets

U.S. PATENT DOCUMENTS

| | | | |
|---|---|---|---|
| 7,840,912 B2 * | 11/2010 | Elias et al. | 715/863 |
| 7,865,868 B2 * | 1/2011 | Falzone Schaw et al. | 717/104 |
| 7,877,707 B2 * | 1/2011 | Westerman et al. | 715/863 |
| 7,924,271 B2 * | 4/2011 | Christie et al. | 345/173 |
| 7,966,578 B2 * | 6/2011 | Tolmasky et al. | 715/863 |
| 8,302,033 B2 * | 10/2012 | Matas et al. | 715/863 |
| 2003/0001854 A1 * | 1/2003 | Jade et al. | 345/581 |
| 2003/0182103 A1 * | 9/2003 | Atkin | 704/9 |
| 2004/0107415 A1 | 6/2004 | Melamed et al. | |
| 2004/0181776 A1 * | 9/2004 | Atkin et al. | 717/111 |
| 2004/0225965 A1 * | 11/2004 | Garside et al. | 715/531 |
| 2005/0065772 A1 * | 3/2005 | Atkin et al. | 704/2 |
| 2007/0088668 A1 | 4/2007 | Larab et al. | |
| 2008/0141221 A1 * | 6/2008 | Benesovska et al. | 717/124 |
| 2008/0165140 A1 * | 7/2008 | Christie et al. | 345/173 |
| 2008/0244443 A1 * | 10/2008 | Schaw et al. | 715/788 |

OTHER PUBLICATIONS

David M. Hilbert et al., "Extracting Usability Information from User Interface Events", 2001 ACM, pp. 384-421, <http://dl.acm.org/citation.cfm?id=371593>.*

Melody Y. Ivory et al., "The State of the Art in Automating Usability Evaluation of User Interfaces", 2001 ACM, pp. 470-516, <http://flamenco.berkeley.edu/papers/computing-surveys01.pdf>.*

Jiming Liu et al., "An Adaptive User Interface Based on Personalized Learning", 2003 IEEE, pp. 52-57, <http://ieeexplore.ieee.org/stamp/stamp.jsp?tp=&arnumber=1193657>.*

Atif M. Memon, "An event-flow model of GUI-based applications for testing", Jan. 2007 Wiley InterScience, pp. 137-157, <http://ssltest.cs.umd.edu/~atif/papers/MemonSTVR2007.pdf>.*

Chetan S. Sankar et al., "The Role of User Interface Professionals in Large Software Projects", 1991 IEEE, pp. 94-100, <http://ieeexplore.ieee.org/stamp/stamp.jsp?tp=&arnumber=87618>.*

Melody M. Moore, "Migrating Legacy User Interfaces to the Internet: Shifting Dialogue Initiative", 2000 IEEE, pp. 52-58, <http://ieeexplore.ieee.org/stamp/stamp.jsp?tp=&arnumber=891452>.*

"Rational Robot", IBM, pp. 1, 2003.

"Selenium IDE", 2006, www.TestingGeek.com, pp. 2.

"HP Functional Testing software", 2007, Hewlett-Packard Development Company, L.P., pp. 1.

"HP WinRunner software", 2007, Hewlett-Packard Development Company, L.P., pp. 1.

"Rational Robot", IBM, downloaded Oct. 19, 2007 from http://www-306.ibm.com/software/awdtools/tester/robot/features/index.html, pp. 1.

* cited by examiner

RECORDING USER-DRIVEN EVENTS WITHIN A COMPUTING SYSTEM

BACKGROUND

A software bug (or simply a "bug") is an error in a computer program that prevents it from executing as intended. Most bugs arise from programming errors in either the source code or in the design of a program. A computer program that contains a large number of bugs, or bugs that seriously interfere with its functionality, is said to be "buggy." The process of correcting the bugs in a computer program is referred to as "debugging."

The efficiency of the debugging process is greatly improved if each bug can be reproduced. Reproducing a bug generated in response to user-driven events requires that the user know the exact sequence of events that were performed that caused the bug to occur. Sometimes a bug results from the culmination of many events happening in a particular sequence that can be nearly impossible for a user to remember. The steps necessary to reproduce a bug are often referred to as the "repro steps."

To complicate the debugging process even further, the person experiencing the bug may not be the same individual who will attempt to debug the program. Therefore, the person experiencing the bug must be able to convey the sequence of events to the person who will debug the application. Conveying the sequence of events requires not only that the person experiencing the bug recall each of the events, but also that each event be conveyed accurately. If the person forgets a particular user-driven event or forgets the order of events, then the user-driven events will not be adequately reproducible. As a result, the bug may not be corrected.

Previous software solutions exist that are capable of recording user-driven events within an application program. These previous solutions suffer from a number of significant limitations, however, that impact their usefulness. In particular, previous solutions often cannot record user-driven events with respect to user interface ("UI") controls that do not expose user-driven events using standard methods. Moreover, previous recording solutions do not record user input made into an input method editor ("IME"). An IME is a program or operating system component that allows computer users to enter characters and symbols not found on their keyboard. An IME, for instance, may allow a user of a Western keyboard to input Chinese, Japanese, or Korean characters. Other previous solutions also do not provide integration with a bug tracking database, thereby adding complexity to the process of properly persisting the repro steps.

It is with respect to these considerations and others that the disclosure made herein is presented.

SUMMARY

Technologies are described herein for recording user-driven events within a computing system. In particular, the technologies and concepts presented herein allow the recording of user-driven events occurring at an IME and at user interface controls that do not expose user-driven events using standard methods. Moreover, recorded data can be provided to a bug tracking application program and stored in a bug database in an automated fashion.

According to one aspect presented herein, a recorder application is provided that is capable of recording user-driven events within a computer system. In particular, the recorder application is capable of detecting changes in the focus of an application program while monitoring for window messages from the application to an operating system. The focus of the application includes, for instance, where a mouse pointer is located on a graphical user interface ("GUI") of the application. The window messages specify user activity such as a click of a mouse button or the pressing of keys on a keyboard. The focus and the user activity specified in the window message are recorded to specify the user-driven event. A system hook is utilized in one implementation by the recorder application to obtain the focus and message data.

According to other aspects, an interface is established between the recorder application and an IME executing on the computer system. Through the interface, the recorder application can obtain data identifying user-driven events that are performed within the IME. For instance, data identifying text typed by a user within the IME may be provided to the recorder application via the interface. The data identifying the user-driven events occurring at the IME is recorded by the recorder application. In one implementation, the interface between the recorder and the IME comprises a text services framework.

According to other aspects, user-driven events may be recorded that are detected at a UI control that does not expose focus and message data using standard methods. When such a control is encountered, a system hook cannot be utilized to obtain data identifying the user-driven events received by the UI control. To overcome this limitation, an interface is established between the recorder application and the UI control. Through the interface between the recorder application and the UI control, the recorder application can obtain data identifying user-driven events detected at the UI control such as focus and window message data. In one implementation, the interface between the recorder application and the UI control comprises an accessibility interface.

According to other aspects, data identifying recorded user-driven events can be provided to a bug tracking application program in an automated fashion. In particular, the recorder application can provide data identifying recorded user-driven events directly to a bug tracking application program for inclusion in a bug database.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
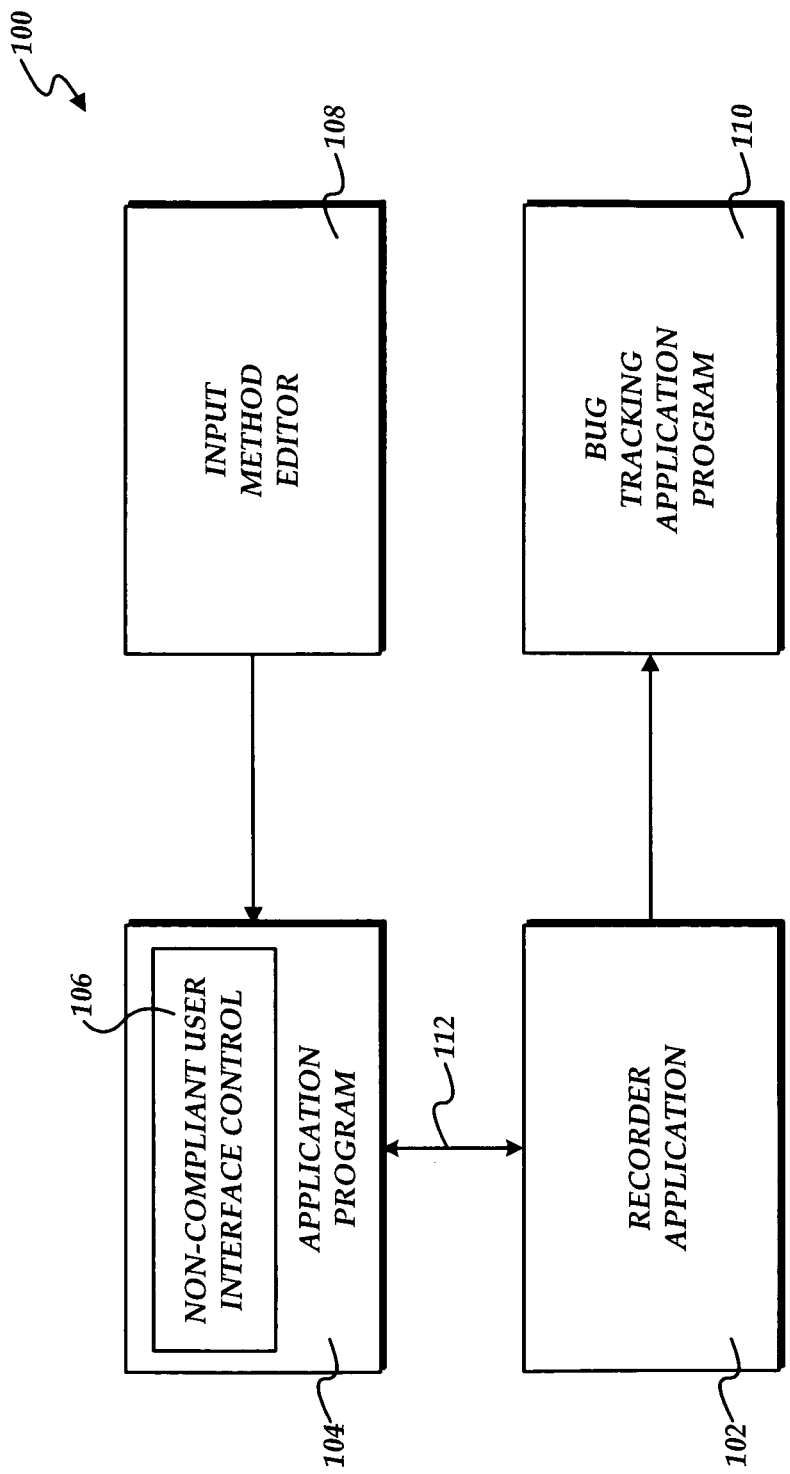
FIG. 1 is a software architecture diagram showing aspects of several software components provided by the embodiments presented herein.

The following detailed description is directed to technologies for recording user-driven events within a computing system. Through the use of the technologies and concepts presented herein, user-driven events with a computing system can be recorded for use in debugging. In particular, user-driven events with respect to UI controls that expose events in a non-standard manner may be recorded, user-driven events with respect to an IME may be recorded, and a record of the user-driven events may be provided to a bug tracking application program in an automated fashion.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for rendering three-dimensional objects on a server computer will be described.

Turning now to FIG. 1, details will be provided regarding an illustrative operating environment and several software components provided by the embodiments presented herein. In particular, FIG. 1 shows aspects of a system 100 for recording user-driven events within a computing system. The system 100 includes a recorder application 102. As will be described in greater detail herein, the recorder application 102 includes functionality for recording user-driven events within the computing system upon which it is executed. In particular, the recorder application 102 can detect and record user-driven events within an application program 104 running on a computer that utilizes a graphical user interface ("GUI"). For instance, changes of focus of the application may be detected and entries for the resulting focus may be logged. Similarly, while changes of focus are being detected, the application program 104 may be monitored for window messages that signify user activity. When a window message occurs, the recorder application 102 utilizes the activity of the window message to specify and record the user-driven event. A series of user-driven events can be recorded up to the occurrence of a malfunction of the application program 104. The series of recorded events may then be utilized by a user to reproduce the malfunction and debug the program code of the application program 104. As will be described in greater detail below, a system hook 112 may be utilized by the recorder application 102 to obtain the focus and message data from the application program 104.

As will also be described in greater detail below, the recorder application 102 may be utilized to record user-driven events occurring at the IME 108. The IME 108 is a program or operating system component that allows computer users to enter characters and symbols not found on their keyboard. The IME 108 may, for instance, allow the user of a Western keyboard to input Chinese, Japanese, or Korean characters. According to embodiments, an interface is established between the IME 108 and the recorder application 102 through which the recorder application 102 can obtain data identifying user-driven events that are performed within the IME 108. The data identifying the user-driven events occurring at the IME 108 is then recorded by the recorder application 102. Additional details regarding the embodiments provided herein for recording user-driven events occurring at the IME 108 are provided below with respect to FIG. 2.

According to other implementations, the recorder application 102 is configured to record user-driven events occurring at a UI control that does not expose focus and message data that can be obtained through the system hook 112. For instance, as illustrated in FIG. 1, the application program 104 may utilize a non-compliant UI control 106 that does not expose focus and other messages using standard methods. When such a user interface control is encountered, the recorder application 102 can utilize another interface to the non-compliant UI control 106 to obtain the user-driven events detected at the UI control 106. Additional details regarding one implementation provided herein for obtaining and recording user-driven events occurring at a non-compliant UI control 106 will be described below with reference to FIG. 3.

According to another aspect presented herein, the recorder application 102 is further configured to provide data identifying recorded user-driven events to a bug tracking application program 110 in an automated fashion. For instance, according to implementations, the recorder application 102 may expose a UI control which, when selected, will cause the bug tracking application program 110 to be executed and a current set of repro steps to be submitted to the bug tracking application program 110 for inclusion in a bug database. Additional details regarding this functionality will be provided below with respect to FIG. 4.

As discussed briefly above, in one implementation, the recorder application 102 is operative to utilize a system hook 112 to communicate with the application program 104. In particular, through the system hook 112 the recorder application 102 can obtain changes in focus of the application 104 while monitoring for window messages from the application 104 to an operating system. For instance, the focus of the application 104 may include the location where a mouse pointer is located on a GUI of the application 104. Window messages may specify user activity such as a click of a mouse button or the pressing of keys on a keyboard. The focus of user activity specified in the window messages is recorded to specify the user-driven event. It should be appreciated that systems and methodologies for recording of user-driven events within a computer application utilizing a system hook 112 are disclosed in U.S. Pat. No. 6,968,509, filed on Jun. 5, 2002, and entitled "Recording of User-Driven Events Within A Computer Application," which is assigned to the Assignee of the instant application and incorporated herein by reference in its entirety. Additional details regarding the embodiments presented herein for identifying and recording user-driven events from an IME 108, from a non-compliant UI control 106, and for providing recorded events to a bug tracking application program 110 will be provided below with respect to FIGS. 2-4.

Figure 2:
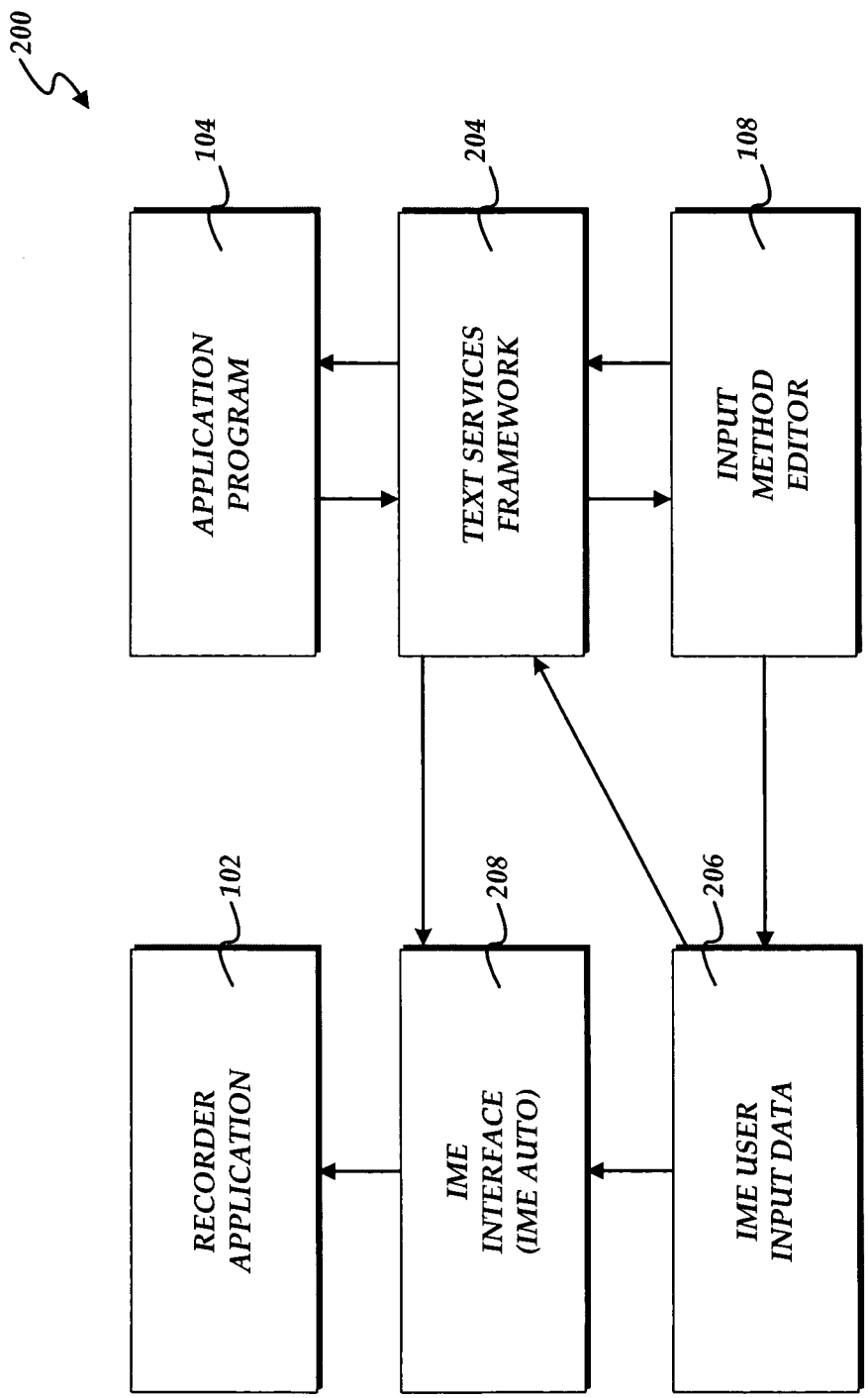
FIG. 2 is a software architecture diagram showing aspects of an embodiment presented herein for recording user-driven events with respect to an IME.

Referring now to FIG. 2, additional details will be provided regarding embodiments presented herein for recording user-driven events occurring at the IME 108. As illustrated in FIG. 2, a software architecture 200 is provided for recording user-driven events occurring at the IME 108. The IME 108 is configured to operate in conjunction with an application program 104 to provide input for entering characters not present on a computer keyboard. For instance, the IME 108 may provide functionality for entering characters such as Chinese, Japanese, or Korean characters. Through interaction with the IME 108, such characters can be specified and provided to the application program 104. For instance, the application program 104 may comprise a word processing application and the IME 108 may be utilized to input Far East characters into a word processing document.

According to one embodiment presented herein, the recorder application 102 is operative not only to record user-driven events occurring at the application program 104, but also to record user-driven events occurring at the IME 108. In order to perform this functionality, an interface is established between the recorder application 102 and the IME 108. Through the interface, data identifying user-driven events detected at the IME 108 can be provided to the recorder application 102. When the recorder application 102 receives the data identifying the user-driven event detected at the IME 108, the recorder application records the data, such as, for instance, within a sequence of repro steps.

According to the implementation shown in FIG. 2, the interface between the IME 108 and the recorder application 102 comprises a text services framework 204. The text services framework 204 is a system service that provides a framework for the delivery of advanced text input. In the embodiment shown in FIG. 2, the text services framework 204 provides the interface for obtaining data describing user-driven events occurring at the IME 108. In one particular implementation, the text services framework 204 comprises the MICROSOFT WINDOWS TEXT SERVICES FRAMEWORK.

As illustrated in FIG. 2, the text services framework 204 interfaces with the IME 108. When user-driven events are detected at the IME 108, the text services framework 204 outputs the IME user input data 206. The IME user input data 206 identifies the user-driven events detected at the IME 108. In this embodiment, an IME interface 208 is utilized to perform the actual communication with the text services framework 204. It should be appreciated, however, that the recorder application 102 may communicate directly with the text services framework 204 to retrieve the IME user input data 206. The IME interface 208 provides the IME user input data 206 to the recorder application 102. The recorder application 102 then records the user-driven events detected at the IME 108, such as in a sequence of repro steps.

According to various embodiments, the type of user-driven events detected at the IME 108 may include the current composing character, keystrokes typed by a user into the IME 108, characters the user finalizes within the IME 108, change candidates, a list of candidate characters, IME-specific actions such as reconversion, and language change information. The IME user input data 206 provided by the text services framework 204 may identify these user-driven events and others to the recorder application 102.

Figure 3:
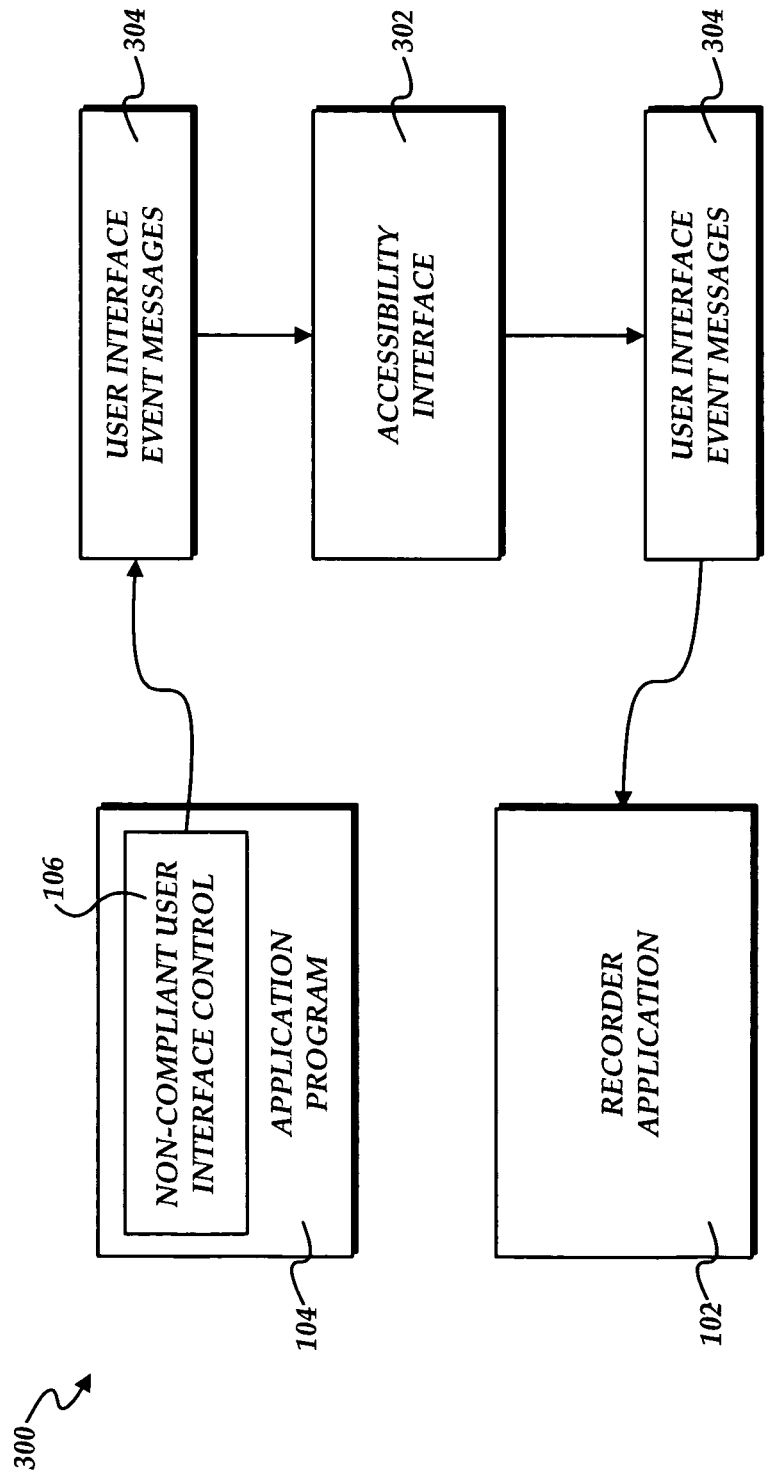
FIG. 3 is a software architecture diagram showing aspects of an embodiment presented herein for recording user-driven events through the use of an accessibility interface.

Turning now to FIG. 3, aspects of a software architecture 300 for recording user-driven events generated by a non-compliant UI control 106 will be described. As discussed briefly above, the application program 104 may utilize UI controls that generate non-standard focus and event messages. In this case, the system hook 112 cannot be utilized to receive data from the non-compliant UI control regarding the user-driven events. One example of such a UI control is the "ribbon" user interface control utilized by the MICROSOFT OFFICE 2007 suite of office productivity applications from MICROSOFT CORPORATION of Redmond, Wash. Other UI controls may also generate non-standard window and event messages.

In order to detect user-driven events at a non-compliant UI control 106, the recorder application 102 is configured to establish an interface with the non-compliant UI control 106 through which the recorder application 102 can obtain data identifying user-driven events detected at the UI control 106, such as focus and window message data. This allows the recorder application 102 to record user-driven events from the non-compliant UI control 106.

In one implementation, the interface between the recorder application 102 and the non-compliant UI control 106 comprises an accessibility interface 302. The accessibility interface 302 provides a standard, consistent mechanism for applications and accessibility clients to exchange information. In one implementation, the accessibility interface 302 comprises the MICROSOFT ACTIVE ACCESSIBILITY programming interface. An Active Accessibility client is any program that uses the accessibility interface 302 to access, identify, or manipulate user interface elements of an application. Clients may include, for instance, accessibility aids, automated testing tools, and computer-based training applications. Accessibility aids are specialized programs that help people with disabilities use computers more effectively.

As illustrated in FIG. 3, the non-compliant UI control 106 provides user interface event messages 304 to the accessibility interface 302. Other types of messages may be provided by the non-compliant UI control 106 to the accessibility interface 302. In turn, the accessibility interface 302 provides the user interface event messages 304 to the recorder application 102. A mechanism may be provided by the accessibility interface 302 that allows the recorder application 102 to register for notification and provision of such messages. The recorder application 102 may then filter and record the user interface event messages 304, such as within a sequence of repro steps.

Figure 4:
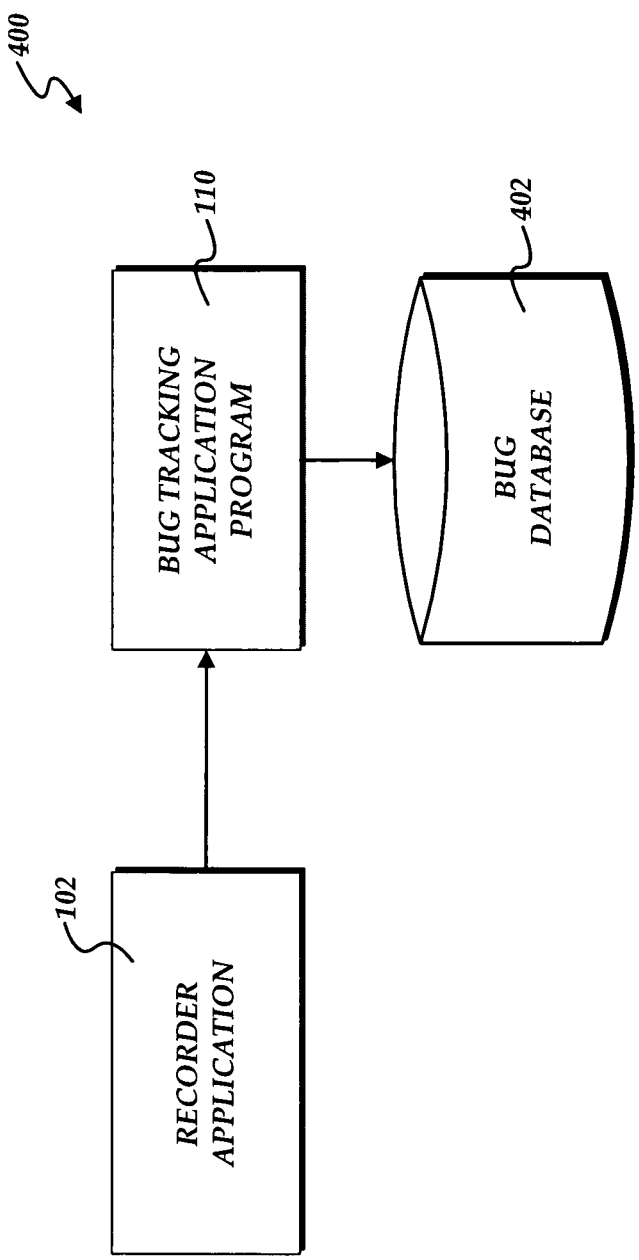
FIG. 4 is a software architecture diagram showing aspects of an embodiment presented herein for submitting data describing recorded user-driven events to a bug tracking application program in an automated fashion.

Referring now to FIG. 4, additional details will be provided regarding a software architecture 400 provided herein for providing recorded repro steps to a bug tracking application program 110 in an automated fashion. As discussed above, the recorder application 102 is operative to utilize the functionality described herein to create a sequence of repro steps. The repro steps are the recorded sequence of steps necessary to reproduce a bug in the application program 104. Repro steps may include user-driven events detected at the IME 108, the non-compliant user interface control 106, or detected through the system hook 112. According to embodiments presented herein, the recorder application 102 is further operative to provide the repro steps to the bug tracking application 110 in an automated fashion.

The bug tracking application 110 is an application program utilized by programmers to maintain data regarding the process for detecting and correcting bugs within the application program 104. In this regard, the bug tracking application program 110 may utilize a bug database 402. The bug database 402 is utilized by the bug tracking application 110 to store data regarding the bugs detected within the application program 104, such as the sequence of repro steps necessary to recreate the bug, and other data regarding the process of correcting the identified bugs.

According to one implementation, the recorder application 102 is configured to display a UI control to a user which, when selected, will cause the bug tracking application program 110 to be executed. According to implementations, the recorder application 102 may also provide functionality for automatically providing a current set of repro steps to the bug tracking application 110 for inclusion in the bug database 402. In this manner, the user-driven events recorded by the recorder application 102 as described above with reference to FIGS. 1-3 may be provided to the bug tracking application program 110 for inclusion in the bug database 402 in an automated fashion. This frees the user of the recorder application 102 from having to manually insert the recorded user-driven events into the bug tracking application 110.

Figure 5:
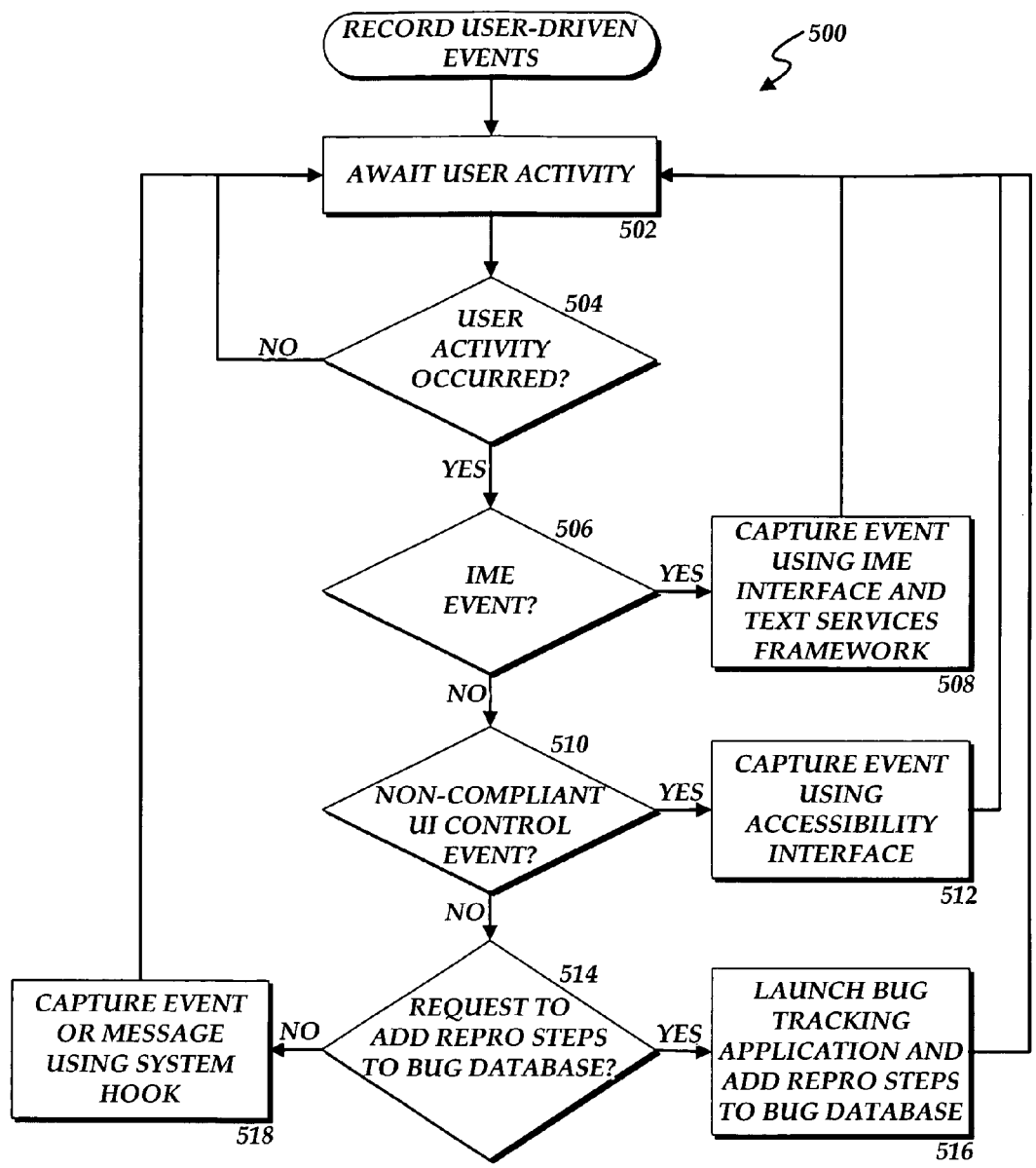
FIG. 5 is a flow diagram illustrating aspects of the operation of a recording application provided in one embodiment presented herein.

Referring now to FIG. 5, additional details will be provided regarding the embodiments presented herein for recording user-driven events within a computing system. In particular, FIG. 5 is a flow diagram showing a routine 500 that illustrates aspects of the operation of the recorder application 102 for recording user-driven events. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 500 begins at operation 502, where the recorder application 102 awaits user activity. At operation 504, the recorder application 102 determines whether any user activity has occurred. If no user activity has occurred, the routine 500 returns to operation 502, described above. If user activity is detected, the routine 500 continues to operation 506, where the recorder application 102 determines whether a user-driven event was detected at the IME 108. If so, the routine 500 branches from operation 506 to operation 508, where the recorder application 102 captures data identifying the user-driven event utilizing the interface to the IME 108. In particular, in the implementation discussed above with respect to FIG. 2, the IME interface 208 and the text services framework 204 are utilized to retrieve the IME user input data 206 from the IME 108. Once received at the recorder application 102, this data is recorded for future transmission to the bug tracking application 110. From operation 508, the routine 500 returns to operation 502, described above.

If, at operation 506, the recorder application 102 determines that a user-driven event was not detected at the IME 108, the routine 500 continues from operation 506 to operation 510. At operation 510, the recorder application 102 determines if a user-driven event was detected at the non-compliant UI control 106. If so, the routine 500 branches to operation 512, where the recorder application 102 captures data identifying the user-driven event occurring at the non-compliant UI control 106 utilizing the accessibility interface 302. Additional details were provided above with respect to FIG. 3 describing this process. Once the user interface event messages 304 or other data generated by the non-compliant UI control 106 in response to the user-driven event have been captured by the recorder application 102, this information is recorded for transmission to the bug tracking application program 110. From operation 512, the routine 500 returns to operation 502, described above.

If, at operation 510, the recorder application 102 does not detect a user-driven event at the non-compliant UI control 106, the routine 500 continues from operation 510 to operation 514. At operation 514, the recorder application 102 determines if a user request has been received to transmit the data defining the recorded user-driven events to the bug database 402. If so, the routine 500 branches to operation 516, where the recorder application 102 causes the bug tracking application program 110 to be launched and provides the data defining the recorded user-driven events to the bug tracking application program 110 with instructions for the provided data to be included in the bug database 402. From operation 516, the routine 500 returns to operation 502, described above.

If, at operation 514, the recorder application 102 determines that a request has not been received to add the recorded user-driven events to the bug database 402, the routine 500 branches from operation 514 to operation 518. At operation 518, other processing may take place, such as the capturing of user-driven events or messages at the application program 104 through the use of the system hook 112. As discussed briefly above, the system hook 112 can be utilized to record standard window and event messages provided by the application 104 to an operating system. From operation 518, the routine 500 returns to operation 502, described above where additional user-driven events may be recorded by the recorder application 102.

Figure 6:
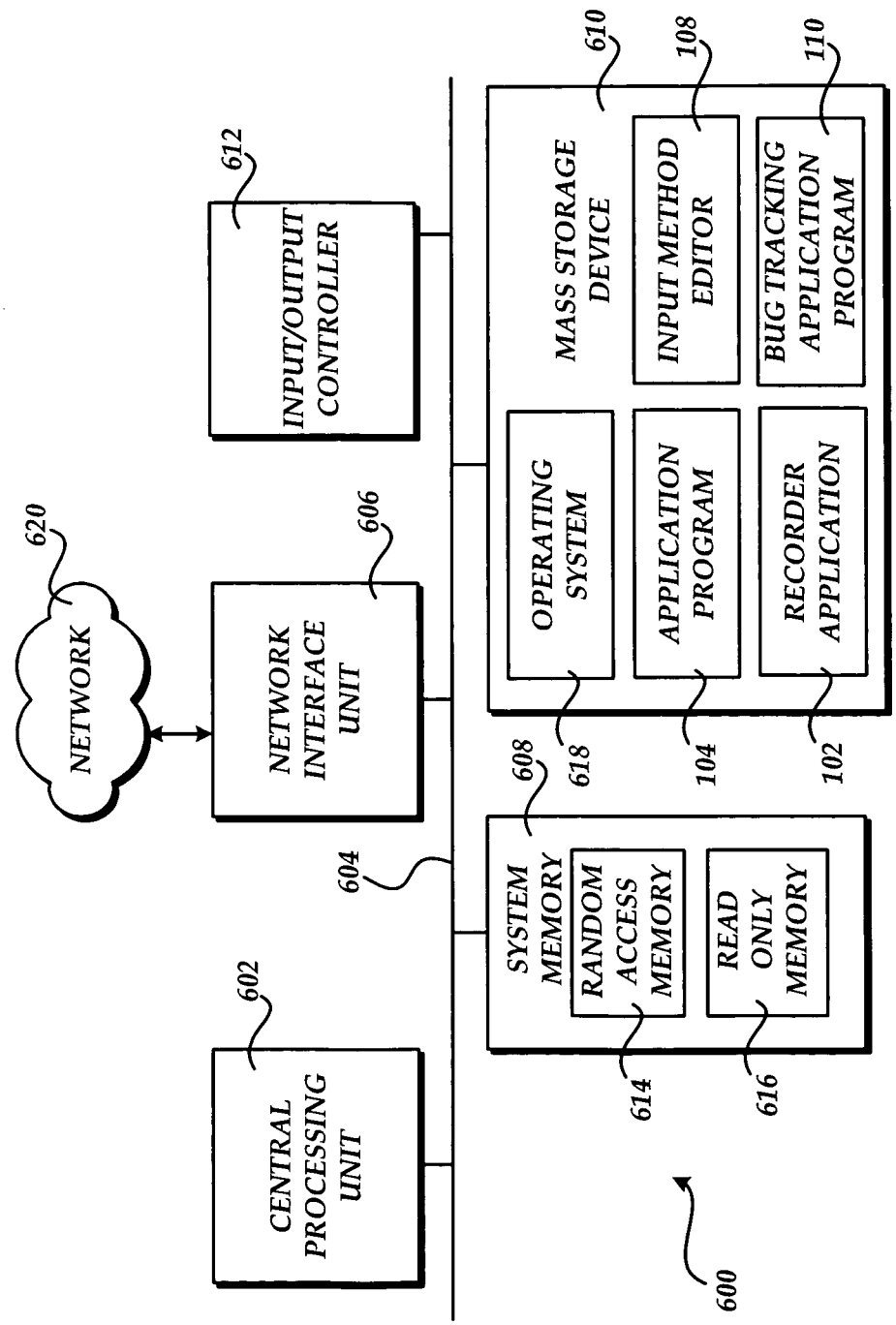
FIG. 6 is a computer architecture diagram showing an illustrative computer hardware and software architecture for a computing system capable of implementing the software components presented herein in embodiments.

FIG. 6 shows an illustrative computer architecture for a computer 600 capable of executing the software components described herein for recording user-driven events within a computing system in the manner presented above. The computer architecture shown in FIG. 6 illustrates a conventional desktop, laptop, or server computer and may be utilized to execute any aspects of the software components presented herein.

The computer architecture shown in FIG. 6 includes a central processing unit 602 ("CPU"), a system memory 608, including a random access memory 614 ("RAM") and a read-only memory ("ROM") 616, and a system bus 604 that couples the memory to the CPU 602. A basic input/output system containing the basic routines that help to transfer information between elements within the computer 600, such as during startup, is stored in the ROM 616. The computer 600 further includes a mass storage device 610 for storing an operating system 618, application programs, and other program modules, which are described in greater detail herein.

The mass storage device 610 is connected to the CPU 602 through a mass storage controller (not shown) connected to the bus 604. The mass storage device 610 and its associated computer-readable media provide non-volatile storage for the computer 600. Although the description of computer-readable media contained herein refers to a mass storage device, such as a hard disk or CD-ROM drive, it should be appreciated by those skilled in the art that computer-readable media can be any available computer storage media that can be accessed by the computer 600.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 600.

According to various embodiments, the computer 600 may operate in a networked environment using logical connections to remote computers through a network such as the network 620. The computer 600 may connect to the network 620 through a network interface unit 606 connected to the bus 604. It should be appreciated that the network interface unit 606 may also be utilized to connect to other types of networks and remote computer systems. The computer 600 may also include an input/output controller 612 for receiving and processing input from a number of other devices, including a keyboard, mouse, or electronic stylus (not shown in FIG. 6). Similarly, an input/output controller may provide output to a display screen, a printer, or other type of output device (also not shown in FIG. 6).

As mentioned briefly above, a number of program modules and data files may be stored in the mass storage device 610 and RAM 614 of the computer 600, including an operating system 618 suitable for controlling the operation of a networked desktop, laptop, or server computer. The mass storage device 610 and RAM 614 may also store one or more program modules. In particular, the mass storage device 610 and the RAM 614 may store the application program 104, the recorder application 102, the IME 108, and the bug tracking application program 110, each of which was described in detail above with respect to FIGS. 1-5. The mass storage device 610 and the RAM 614 may also store other types of program modules.

Based on the foregoing, it should be appreciated that technologies for recording user-driven events within a computing system are provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for recording user-driven events within a computing system, the method comprising:
  establishing
    a first interface between a recorder application and an input method editor (IME) executing on the computing system, the first interface being configured to provide data identifying a first user-driven event detected at the IME to the recorder application,
    a second interface between the recorder application and a user interface (UI) control that generates non-standard focus and event messages, the second interface being configured to provide data identifying a second user-driven event detected at the UI control to the recorder application, and
    a third interface between the recorder application and an application program, the third interface being configured to provide data identifying a third user-driven event detected at the application program to the recorder application, wherein the UI control and the application program are different, and wherein the first, second, and third user-driven events are different;
  receiving data identifying the first user-driven event detected at the IME on the first interface, the second user-driven event detected at the UI control on the second interface, and the third user-driven event detected at the application program on the third interface; and
  recording the data identifying the first user-driven event, the second user-driven event, and the third user-driven event.

2. The method of claim 1, wherein the first interface comprises a text services framework.

3. The method of claim 1, wherein the second interface comprises an accessibility interface.

4. The method of claim 1, wherein the third interface comprises a system hook.

5. The method of claim 1, further comprising:
  providing the data identifying the first user-driven event detected at the IME to a bug tracking application program;
  providing the data identifying the second user-driven event detected at the UI control to the bug tracking application program; and
  providing the data identifying the third user-driven event detected at the application program to the bug tracking application program.

6. The method of claim 5, wherein providing the data identifying the first user-driven event detected at the IME, the data identifying the second user-driven event detected at the UI control, and the data identifying the third user-driven event detected at the application program to the bug tracking application program comprises:
  receiving a request to provide the data identifying the first user-driven event detected at the IME, the data identifying the second user-driven event detected at the UI control, and the data identifying the third user-driven event detected at the application program to the bug tracking application program;
  causing the bug tracking application program to be executed in response to receiving the request;
  providing the data identifying the first user-driven event detected at the IME, the data identifying the second user-driven event detected at the UI control, and the data identifying the third user-driven event detected at the application program to the bug tracking application program; and
  causing the data provided to the bug tracking application program to be stored in a bug tracking database maintained by the bug tracking application program.

7. A computer storage medium having computer-executable instructions stored thereon which, when executed by a computer, cause the computer to:
  establish
    a first interface between the recorder application and a user interface (UI) control that generates non-standard focus and event messages, the first interface being configured to provide data identifying a first user-driven event detected at the UI control to the recorder application,
    a second interface between a recorder application and an input method editor (IME) executing on the computing system, the second interface being configured to provide data identifying a second user-driven event detected at the IME to the recorder application, and a third interface between the recorder application and an application program, the third interface being configured to provide data identifying a third user-driven event detected at the application program to the recorder application, wherein the UI control and the application program are different, and wherein the first, second, and third user-driven events are different;

receive data identifying the first user-driven event detected at the UI control on the first interface, the second user-driven event detected at the IME on the second interface, and the third user-driven event detected at the application program on the third interface; and record the data identifying the first user-driven event, the second user-driven event, and the third user-driven event.

8. The computer storage medium of claim 7, comprising further computer-executable instructions stored thereon that, when executed by the computer, cause the computer to:

provide the data identifying the first user-driven event detected at the UI control to a bug tracking application program;

provide the data identifying the second user-driven event detected at the IME to the bug tracking application program;

and provide the data identifying the third user-driven event detected at the application program to the bug tracking application program.

9. The computer storage medium of claim 8, wherein the second interface comprises a text services framework.

10. The computer storage medium of claim 9, wherein the first interface comprises an accessibility interface.

11. The computer storage medium of claim 10, wherein the third interface comprises a system hook.

12. A method for recording user-driven events within a computing system, the method comprising:

executing a recorder application on the computing system, the recorder application configured to record user-driven events occurring within the computing system;

establishing a text services framework between the recorder application and an input method editor (IME);

establishing an accessibility interface between the recorder application and a user interface (UI) control that generates non-standard focus and event messages;

establishing an interface between the recorder application and an application program;

providing data identifying a first user-driven event detected at the IME by way of the text services framework between the recorder application and the IME;

recording the data identifying the first user-driven event detected at the IME by way of the recorder application;

providing data identifying a second user-driven event detected at the UI control by way of the accessibility interface between the recorder application and the UI control;

recording the data identifying the second user-driven event detected at the UI control by way of the recorder application;

providing data identifying a third user-driven event detected at the application program on the interface between the recorder application and the application program, wherein the UI control and the application program are different, and wherein the first, second, and third user-driven events are different;

recording the data identifying the third user-driven event detected at the application program by way of the recorder application; and providing the data identifying the first user-driven event detected at the IME, the data identifying the second user-driven event detected at the UI control, and the data identifying the third user-driven event detected at the application program to a bug tracking application program for storage in a bug database.

13. The method of claim 12, wherein the interface between the recorder application and the application program comprises a system hook.

* * * * *